US012229177B2

(12) United States Patent
Singh et al.

(10) Patent No.: US 12,229,177 B2
(45) Date of Patent: *Feb. 18, 2025

(54) INTELLIGENT DIGITAL ASSISTANT THAT PROVIDES END-USER WITH INFORMATION FROM FIRM DATABASES TO ASSIST END-USER IN PERFORMING JOB FUNCTIONS

(71) Applicant: MORGAN STANLEY SERVICES GROUP INC., New York, NY (US)

(72) Inventors: Amit Kumar Singh, Bangalore (IN); Ravish Sharma, Delhi (IN); Kevin Eng, Flushing, NY (US); Vikram Hemrajani, Kowloon (HK); Monika Nica, New York, NY (US); Eden Kidner, New York, NY (US)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/410,354

(22) Filed: Jan. 11, 2024

(65) Prior Publication Data

US 2024/0152536 A1    May 9, 2024

Related U.S. Application Data

(63) Continuation of application No. 17/484,701, filed on Sep. 24, 2021, now Pat. No. 11,874,865.

(51) Int. Cl.
*G06F 7/00* (2006.01)
*G06F 9/445* (2018.01)
(Continued)

(52) U.S. Cl.
CPC ...... *G06F 16/3344* (2019.01); *G06F 9/44526* (2013.01); *G06N 20/00* (2019.01); *H04L 51/42* (2022.05)

(58) Field of Classification Search
CPC .... G06F 16/332; G06F 16/334; G06F 16/335; G06F 16/338; G06F 16/3344;
(Continued)

(56) References Cited

U.S. PATENT DOCUMENTS 6,484,155 B1   11/2002  Kiss et al.
8,849,701 B2 *  9/2014  Willis .................... A63F 13/79
                                            705/14.66
(Continued)

*Primary Examiner* — Mohammad A Sana
(74) *Attorney, Agent, or Firm* — K&L Gates LLP

(57) ABSTRACT

Improved artificial intelligence computer systems actively and/or passively provide end-users with information from firm data systems to help the end-user perform the end-user's job functions. In a passive implementation, the system can prioritize emails for a user, craft consistent responses to multiple email inquiries on the same topic, craft responses whose content is drawn from a library of electronic documents, and/or suggest text for an electronic document being authored by the end-user. In an active implementation, the system comprises AI agents associated with individual databases of the system, where the AI agents are tuned to retrieve data from their associated database in response to a query from the end-user.

22 Claims, 9 Drawing Sheets

(51) Int. Cl.
*G06N 20/00* (2019.01)
*H04L 51/42* (2022.01)

(58) Field of Classification Search
CPC .. G06F 9/44526; G06F 9/44505; G06F 9/451;
G06N 20/00; G06N 3/08; G06N 3/044;
H04L 51/42; H04L 51/02; H04L 12/1818
See application file for complete search history.

(56) References Cited

U.S. PATENT DOCUMENTS

| | | | |
|---|---|---|---|
| 11,874,865 B2 * | 1/2024 | Singh | G06F 9/44505 |
| 2010/0179961 A1 | 7/2010 | Berry et al. | |
| 2011/0022552 A1 | 1/2011 | Zimmerman et al. | |
| 2012/0036125 A1 | 2/2012 | Al-Kofahi et al. | |
| 2014/0330890 A1 * | 11/2014 | Hourani | H04W 4/21 |
| | | | 709/203 |
| 2017/0171117 A1 | 6/2017 | Carr et al. | |
| 2017/0329466 A1 | 11/2017 | Krenkler et al. | |
| 2018/0004373 A1 | 1/2018 | Peacock et al. | |
| 2018/0091458 A1 | 3/2018 | Goyal et al. | |
| 2018/0349754 A1 | 12/2018 | Kumar et al. | |
| 2019/0140995 A1 | 5/2019 | Roller et al. | |
| 2019/0197189 A1 | 6/2019 | Studnicka | |
| 2019/0214024 A1 | 7/2019 | Gruber et al. | |
| 2019/0220540 A1 * | 7/2019 | Meling | G06F 16/338 |
| 2021/0374760 A1 * | 12/2021 | Cohen | G06N 20/00 |
| 2023/0099588 A1 * | 3/2023 | Zhou | G06F 16/90335 |
| | | | 707/765 |

* cited by examiner

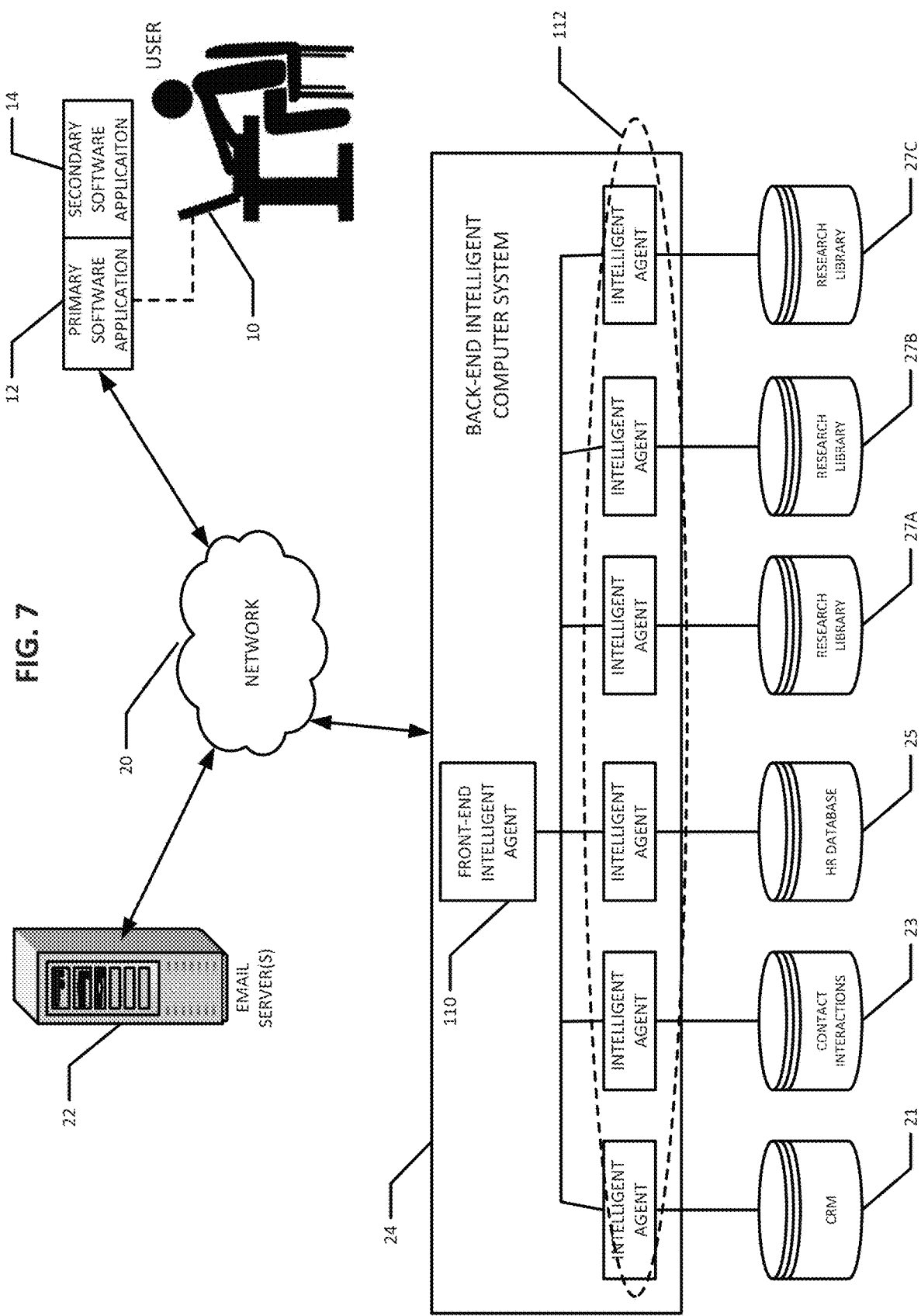

INTELLIGENT DIGITAL ASSISTANT THAT PROVIDES END-USER WITH INFORMATION FROM FIRM DATABASES TO ASSIST END-USER IN PERFORMING JOB FUNCTIONS

PRIORITY CLAIM

The present application is a continuation application claiming priority to U.S. application Ser. No. 17/484,701, filed Sep. 24, 2021, having the same title and inventors as indicated above, and which is incorporated herein by reference in its entirety.

BACKGROUND

In the financial securities research industry, so called "sell-side firms" provide, among other things, research regarding financial securities (such as stocks or bonds) to, among others, so-called "buy-side firms," which are typically institutional investors such as mutual funds, hedge funds, pension funds, etc. Particularly for equity research, sell-side firms typically employ a number of analyst teams that analyze and publish research reports about equity securities for publicly-traded companies in different industry sectors and/or geographic regions. For example, a sell-side firm may have a North America pharmaceuticals research team that analyzes North American publicly-traded pharmaceutical companies, a North America oil services research team that analyzes North American publicly-traded oil services companies, a North America semiconductors research team that analyzes publicly-traded companies that make and sell semiconductor products, and so on. The sell-side firm might also have corresponding European and/or Asian research analyst teams. Large sell-side firms, across all of its analyst teams, can produce on the order of 50,000 research reports per year.

The analyst teams typically include a primary analyst and several research associates, though some teams may have other positions as well. These research teams generate numerous different types of research touch points for consumers of the research (e.g., the buy-side firms). The research touch points may include research reports (e.g., published electronic or hard copy reports), one-to-one telephone calls or meetings with contacts at the buy-side firms, tailored or blast emails and voicemails to such contacts, and/or other events such as seminars, conferences, corporate road shows, and meetings with corporate management.

When a buy-side firm representative contacts a sell-side research analyst with a question about a publicly traded company, the research analyst confines the response to subject matter that was included in a published report. Many sell-side research analyst receive many questions about publicly traded companies via email throughout a workday from various buy-side firm representatives. Present email system are not suitable for or tailored to help a sell-side research analyst prioritize their incoming emails, help the sell-side analyst respond consistently to multiple inquiries from different buy-side contacts that relate to the same topic or issue, and/or help the sell-side analyst confine the responses to the scope of the sell-side firm's published reports.

SUMMARY

In one general aspect, the present invention is directed to improved computer systems for an end-user in an enterprise computer system to enhance the capabilities, efficiency and productivity of the end-user. The computer system can comprise a back-end artificial intelligence (AI) system that provides the end-user with up-to-date, consistent and/or focused information from the firm's system that helps the end-user perform his/her job functions, such as responding to queries of contacts (external to the enterprise) of the end-user with information from the enterprise's systems or otherwise providing the contact with information from the enterprise's systems that is helpful to the contact or helpful to the end-user in interacting with the contact. Various embodiments of the present invention are described below in the context of the enterprise being a sell-side research firm, the end user being a sell-side firm research analyst, and the contacts being buy-side firm representatives. In that case, the computer system helps the research analyst provide up-to-date, consistent and/or focused information to the buy-side contacts of the research analyst. However, the improved computer systems of the present invention are not limited to these particular contexts and can be applied to other contexts and to other types of end-users, as will be apparent from the description below.

The AI-based system may be invoked actively or passively by the end user. For example, the end-user may invoke the AI-system from the end-user's computer device to get more information from the firm's systems for or about a contact. Also, the AI-based system can monitor emails to the end-user, or monitor in real-time work product being prepared by the end-user, and provide the end-user with information from the firm's system to assist the end-user responding to the emails or preparing the work product, as the case may be. For example, the improved computer system of the present invention can comprise a back-end, artificial intelligence (AI) that can, for example, (i) read and process content received by or authored by the end-user and, based thereon, make suggestions to the end-user for work product (e.g., emails or documents) being authored by the end-user or (ii) respond, with a "chatbot(s)," to queries directly from the end-user with information relevant to the end-user's job functions. In such active invocations of the system, the end-user can type the queries into an application with an interface for communicating with the chatbot. The end-user could also voice queries to the interface, with the voice queries being converted to a digital format for transmission to the chatbot for processing. The computer system could comprise multiple (AI) chatbots that can each be tuned or trained to different queries that the end-user might have in the performance of the end-user's job functions so that the "activated" chatbot, i.e., the chatbot trained to respond to a specific query type from the end-user, can respond accurately, quickly and efficiently to the end-user's query.

In various embodiments, the intelligent back-end system that reads what the end-user receives or authors can be integrated to an authoring program on the end-user's computer, such as an email program, a word processing program, an electronic presentation program (e.g., PowerPoint), such that the back-end AI computer system, in concert with software on the end-user's device, can, among other things, prioritize emails for the end-user, craft consistent responses to multiple email inquiries on the same topic, and/or craft responses or text whose content is drawn from a library of electronic documents.

A system for assisting a user of an organization in responding to incoming emails comprises, according to various embodiments, the end-user computer device, an email server for the organization, and a back-end intelligent computer system in communication with the email server and the user computer device. The end-user computer device comprises a software program for reviewing and drafting emails and an inventive ancillary software program that adds a graphical user interface to the software program. The system also comprises database system that comprises a research database, where the research database comprises word-searchable electronic research work product produced by the organization. The back-end intelligent computer system receives data about an incoming email from a contact to the user and comprises trained, machine-learning models, including a Natural Language Processing (NLP) model, such that the back-end intelligent computer system is configured to: (i) identify a query in the incoming email; (ii) search the research database for content in the research database responsive to the query; (iii) generate a query response that is specific to the query after receiving the data about the incoming email, wherein the generated query response is based on content in the research database that is most relevant to the query; and (iv) transmit the query response to the user computer device. The ancillary software program configures a graphical user interface to display the query response while the user prepares a response email to the incoming email using the software program, wherein the graphical user interface comprises a query response button through which the user can automatically insert the query response into the response email.

The systems and methods of the present invention can, in various embodiments, provide many practical and technical advantages over current email systems and email plug-ins. For example, sell-side analysts are often prohibited from providing buy-side contacts non-published research. By generating responses from the word-searchable documents in the research library, which stores the research work product produced by the sell-side firm, the system reduces, and can eliminate, the chance that a sell-side analyst provides non-published research to the buy-side contact. Also, because the system generates the responses, the responses will tend to be more consistent across multiple incoming emails on the same topic. Also, the graphical user interface, which includes incoming-email-specific, appropriate, automated responses that the user can automatically add, simplifies the process of drafting the response email. The user can simply click the button or copy and paste it into the body of the response email, to automatically add the generated responses to the response email. In addition, in various embodiments, the graphical user interface may also have a mechanism for the user to provide feedback to the back-end intelligent computer system on the appropriateness of the automated responses generated by the back-end intelligent computer system. Based on the feedback, the neural models of the back-end intelligent computer system can be continually trained to be more accurate and/or appropriate. The back-end intelligent computer system can also prioritize the user's email over a time period (e.g. overnight) and additionally priority actions that the user should take in response to those email. For example, when a user/analyst comes in to work in the morning (or accesses their overnight emails remotely), the back-end intelligent computer system can have already sorted through the user's emails, prioritized them in the user's email inbox, and generated a prioritized list of suggested actions to execute on that day, as well as the suggestions for each individual email as well, as described above. These and other benefits realizable through the present invention will be apparent from the description below.

FIGURES

Various embodiments of the present invention are described herein by way of example in connection with the following figures.

FIG. 7 is a diagram of the computer system according to other embodiments of the present invention.

DESCRIPTION

The present invention is directed, in various embodiments, to improved computer systems that, through specialized machine learning and AI systems, enhance the capabilities, efficiency and productivity of the end-users in an enterprise computer system. Various embodiments of the present invention are described below in the context of a sell-side firm research analyst using the improved computer systems to provide better or enhanced service for m contacts of the sell-side firm, such as buy-side firm representatives. Thus, in various embodiments, the end-user can be a sell-side firm research analyst and the end-user's enterprise can be the sell-side firm. However, embodiments of the present invention are not necessarily limited to this context and can be extended to other business as will be apparent from this description.

The end-user can interact with, or activate, the back-end AI computer system of the enterprise via software programs on the end-user's computer device that is connected to the enterprise's computer system. In concert with the software on the end-user's computer device, the back-end AI computer system can capture content received by or authored by the end-user and respond with particularized information from the enterprise's database systems that the end-user can use advantageously in the performance of the end-user's job functions. For example, the particular information can provide up-to-date information that the end-user needs to provide to a contact of the enterprise and/or up-to-date information about the client, so that the end-user's response to the client can be, for example, up-to-date with the client's needs and issues, and consistent with other information provided by the enterprise. In other embodiments, the end-user can send queries directly to the back-end AI computer system, and the back-end AI computer system, e.g., a chatbot, can respond with relevant information from the enterprise's databases.

A first embodiment is tailored to helping the end-user respond to email. In that connection, the improved computer systems of the present invention can, among other things, prioritize emails for a user, craft consistent responses to multiple email inquiries on the same topic, and/or craft responses whose content is drawn from a library of electronic documents. The library of electronic documents can be implemented as a database that stores word-searchable electronic versions of research reports published by the sell-side firm. As will be apparent from the description below, the present invention is not limited to email contexts. Aspects of the present invention can be applied and used in other contexts, such as authoring applications (e.g., word processing applications, PowerPoint, etc., where the user is authoring content).

Figure 1:
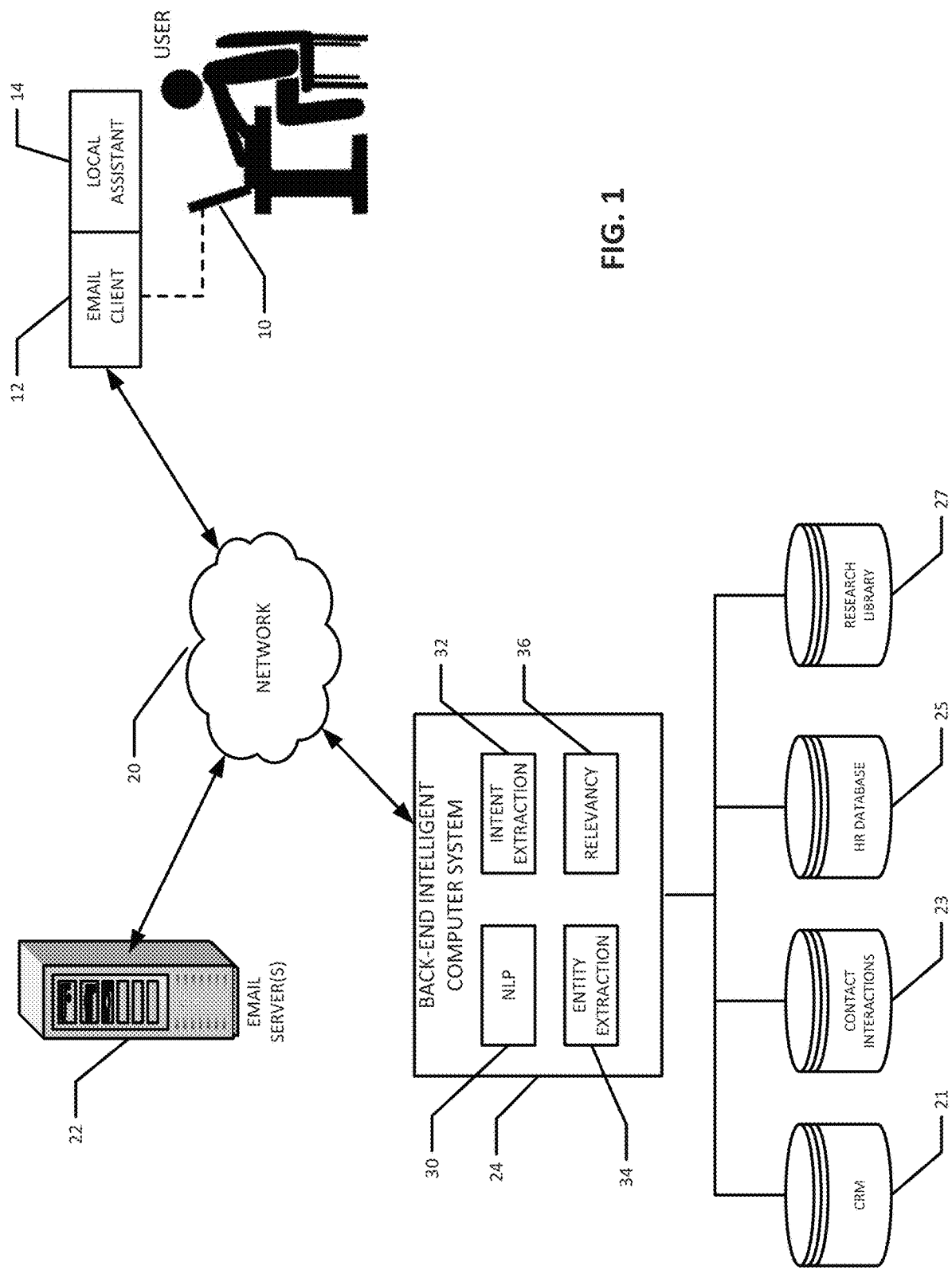
FIG. 1 is a diagram of a computer system according to various embodiments of the present invention.

FIG. 1 is a diagram of a computer system that implements the improved email system according to various embodiments of the present invention. As shown in FIG. 1, a user has a user computer device 10 that comprises several software programs and applications, such as an email program (or client) 12 as well as a local assistant program 14. In various embodiments, the user may be a sell-side firm research analyst or other employee (or agent) of the sell-side research firm, although the present invention is not so limited and the user does not necessarily need to work for a sell-side research firm to enjoy the various benefits of the present invention. The email client 12 may be an email program downloaded and installed on the user computer device 10. For example, the email client 12 could be a Microsoft Outlook or other suitable email client. The local assistant program 14 may be, for example, a plug-in software component that is downloaded and installed on the user computer device 10 and that interfaces with the email client 12 to provided added functionality and customization for the user as described further herein. Also, the email program 12 could be a browser or app for webmail and the local assistant program 14 could be an extension for the webmail that customizes the webmail as described herein. Such an extension may include just source code, whereas a plug-in may comprise object code. Also, instead of the email, the local assistant program 14 could also work (e.g., interface) with other types of communication applications, such as chat clients, such as the Symphony instant messaging service (from Symphony Communication Services, LLC) or other chat clients, as described further below.

As shown in FIG. 1, the user computer device 10 may be connected to a computer network 20. The computer network 20 may be, for example, the corporate computer network of the sell-side research firm (or other type of organization as applicable) and may be implemented, for example, with one or more of a LAN, WAN, intranet, virtual private network, extranet, etc. The user computer device 10 may connect to the computer network 20 via wired and/or wireless data connections, which may include, for example, the Internet.

Also as shown in FIG. 1, the system may include a number of servers interconnected via the computer network. The servers include an email server 22 and a back-end intelligent computer system 24. The email server 22 may be a SMTP (Simple Mail Transfer Protocol) server that's primary purposes are to send, receive, and/or relay outgoing mail between email senders and receivers. It may also manage email accounts for the domain(s) hosted by email server 22 (e.g., the domain for the sell-side research firm or other entity/organization as the case may be). The email server 22 may be, for example, a Microsoft Exchange Server or other applicable email server type.

The local assistant program 14 interfaces with the email server 22 and the back-end intelligent computer system 24 to provide several enhanced email functionalities and customizations for the user of the user computer device 10. For the example, the back-end intelligent computer system 24, through machine learning, can read and interpret email sent to (and received by) the user computer device 10. For example, the back-end intelligent computer system 24 can read and interpret the sender, subject (from the subject line), the body, the signature, and any attachments to incoming emails. In addition, through machine learning, the back-end intelligent computer system 24 is trained to understand the intent of the incoming emails, any questions asked in the email (such as, for a sell-side research firm recipient, "what is your view" on a particular investment?), and any actions requested in the email (e.g., a meeting request). With this information from the back-end intelligent computer system 24, the local assistant program 14 can provide to the user of the user computer device 10 (e.g., the email recipient), via a graphical user interface (GUI) displayable on the user computer device 10, in-line, related contextual information on the email sender (e.g., past meetings with the sender, in what the sender is interested, relationships that the sender has with others in the recipient's organization, etc.) as well as provide past (typically and preferably) recent emails sent by the recipient or the recipient's organization that are responsive to requests in the incoming email. The GUI provided by the local assistant program 14 may also allow the user to select (e.g., highlight) certain text of the incoming email to send to the back-end intelligent computer system 24, which the back-end intelligent computer system 24 can then interpret and respond with a response. The back-end intelligent computer system 24 can generate the response based on a library 27 of electronic documents.

Still further, the local assistant program 14 can then allow, via the GUI, the user to embed the response from the back-end intelligent computer system 24 in a response email to the original sender. For example, the GUI may allow the user to embed the text of the response from the back-end intelligent computer system 24 in the email back to the original sender via, for example, a single-click of the GUI, without the user having to retype the text of the response in the email back to the original sender. Still further, before the email response is sent back to the original sender, the back-end intelligent computer system 24 can review the email from the user to identify potential errors or inconsistencies and, in response, prompt the user to make corrections before the email is sent to the original sender. The local assistant program 14, in conjunction with the back-end intelligent computer system 24, can prioritize incoming emails for the user.

The back-end intelligent computer system 24 relies on data from a number of data stores to provide the necessary data for the user. The data stores can includes a customer relationship management (CRM) data store 21, a contact interactions data store 23, a human resources (HR) data store 25 and a research library 27. The CRM data store 21 may store information about contacts of the sell-side firm, such as the name and contact information for each contact. The CRM data store 21 can also store data about the company, such as a buy-side firm, for which the contact works. For example, in embodiments where the sell-side firms has service tiers for its customers (e.g., buy-side firms), the CRM data store 21 can store the tier level for the customers (1st Tier, 2nd Tier, etc.). Service tier level information can be used to prioritize emails of the user. For example, emails from contacts that are employed by (or affiliated with) higher service tier level customers can be prioritized higher than emails from contacts are employed by (or affiliated with) lower service tier level customers. Particularly in the case of sell-side and buy-side firms, the CRM data store 21 can also store data about the various investment funds administered by the buy-side firms, the holdings (e.g., stocks, investments, etc.) of those funds, and trade data for those funds (e.g., what stocks is the fund buying or selling over a time period).

Still further, the CRM data store 21 can store relationships scores or ranks for the contacts of the firm. The relationship scores and/or rank can be scores or ranks, as the case may be, between two persons, such as a person at the firm (e.g., sell-side firm) or organization for and an external contact of the firm/organization, such as the senders of the incoming emails, where the scores/ranks can be computed based on quantity and frequency of telephone and email interactions between the two people. The scores/ranks can be computed in advance for multiple persons at the firm/organization for many external contacts so that the scores/ranks are pre-computed when a new email is received from an external contact. The scores/ranks may be updated periodically to reflect recent telephone and email interactions. More details about computing such relationship scores/ranks are described in U.S. Pat. No. 9,426,306, assigned to Morgan Stanley Services Group Inc.

The interactions data store 23 stores data about interactions that the contact had with the research teams of the sell-side firm. The interactions between the contacts and the sell-side firm can include interactions such as emails, phone calls, and meetings involving the various contacts and members of the sell-side firm. This interaction-type data may include the date, time, duration, participants and/or topic(s) of the interaction. The data may be entered into the interactions data store 23 by employees/agents of the sell-side firm. The interactions data store 23 may also store data about the sell-side firm's research work products the contacts accessed (e.g., downloaded from a sell-side firm website) and when. The interactions data store 23 can also store interest scores, from interest models, of the sender's interests, such as the sender's interests in various individual stocks, groups of stocks (e.g., pharmaceutical stocks, high dividend stocks), and/or asset classes (bonds, derivatives, commodities, etc.), etc. The interest scores can be derived from the research from the sell-side firm that the sender/contacts reads (or downloads from the sell-side firm's website), the sender/contact's interactions with the various research teams of the sell-side firm, the holdings and trades of the buy-side firm associates with the sender/contact, etc. More details regarding how such interest scores can be computed are described in U.S. Pat. No. 8,694,413, titled "Computer-based systems and methods for determining interest levels of consumers in research work product produced by a research department" and U.S. Pat. No. 8,566,146, titled "Computer-based systems and methods for computing a score for contacts of a financial services firm indicative of resources to be deployed by the financial services firm for the contacts to maximize revenue for the financial services firm," both of which are assigned to Morgan Stanley Services Group Inc. and both of which are incorporated herein by reference in their entirety.

The HR data store 25 may store data about the employees/email users of the sell-side firm, including the job function and responsibilities of the employees. This information can be used in prioritizing the employees' emails. Email inquiries that pertain to the job function of the employee can be prioritized higher than emails that do not related to the job function of the employee.

The research library 27 may store electronic, word-searchable research work product produced by the analyst teams of the sell-side form, such as electronic copies of research reports and other work product of the analyst teams, in addition to data about the research work product (e.g., metadata), such as the date of creation of the research work product, the analyst team that produced the report, and the companies, industry sectors, and/or geographic regions to which the research work product pertains. More details regarding such data stores 21, 23, 25 and 27 may be found in the following patent documents that are incorporated herein by reference in their entirety: U.S. Pat. Nos. 7,734,517; 7,689,490; 7,769,654; U.S. published patent application Pub. No. 2010/0290603; and WO 2007/038587 A2.

Either or both of these servers 22, 24 may be implemented, as necessary, with one or more physical server computer devices that are interconnected. The servers may be co-located or geographically dispersed, in which case they can be in communication via the computer network 20. The data stores 21, 23, 25, 27 may be implemented as computer databases, data files, directories, or any other suitable system for storing data for use by computers. The data stores may be embodied as solid state memory (e.g., ROM), hard disk drive systems, RAID, disk arrays, storage area networks (SANs), and/or any other suitable system for storing computer data. In addition, the data stores may comprise data caches, including web caches and database caches.

As FIG. 1 shows, the back-end intelligent computer system 24 may comprise several AI and/or machine learning sub-systems, each of which may be implemented by software. The back-end intelligent computer system 24 may comprise, for example, several artificial intelligence (AI)/machine learning (ML) systems for providing the functionality described herein. For example, the back-end intelligent computer system 24 can comprise a natural language processing (NLP) component 30 that uses NLP to interpret the text of an incoming email to the user, as well as for interpreting emails drafted by the user before they are sent (e.g., to check for errors, etc.). The back-end intelligent computer system 24 may also comprise an intent extraction component 32 and an entity extraction component 34. The intent extraction component 32 may be trained through machine learning to determine the intent of the incoming emails to the user and the entity extraction component 32 may be trained through machine learning to determine the entity with which the sender is associated (e.g., a buy-side firm). In addition, the back-end intelligent computer system 24 may comprise a relevancy component 36 that is trained, through machine learning, to determine the most relevant content in the electronic library 27 that is responsive to any question(s) or request(s) in the incoming email. The back-end intelligent computer system 24 can then return this relevant information to the user (via the network 20) so that the user can include it in a response to the original sender through interactions with GUI provided by the local assistant program 14.

Figure 2:
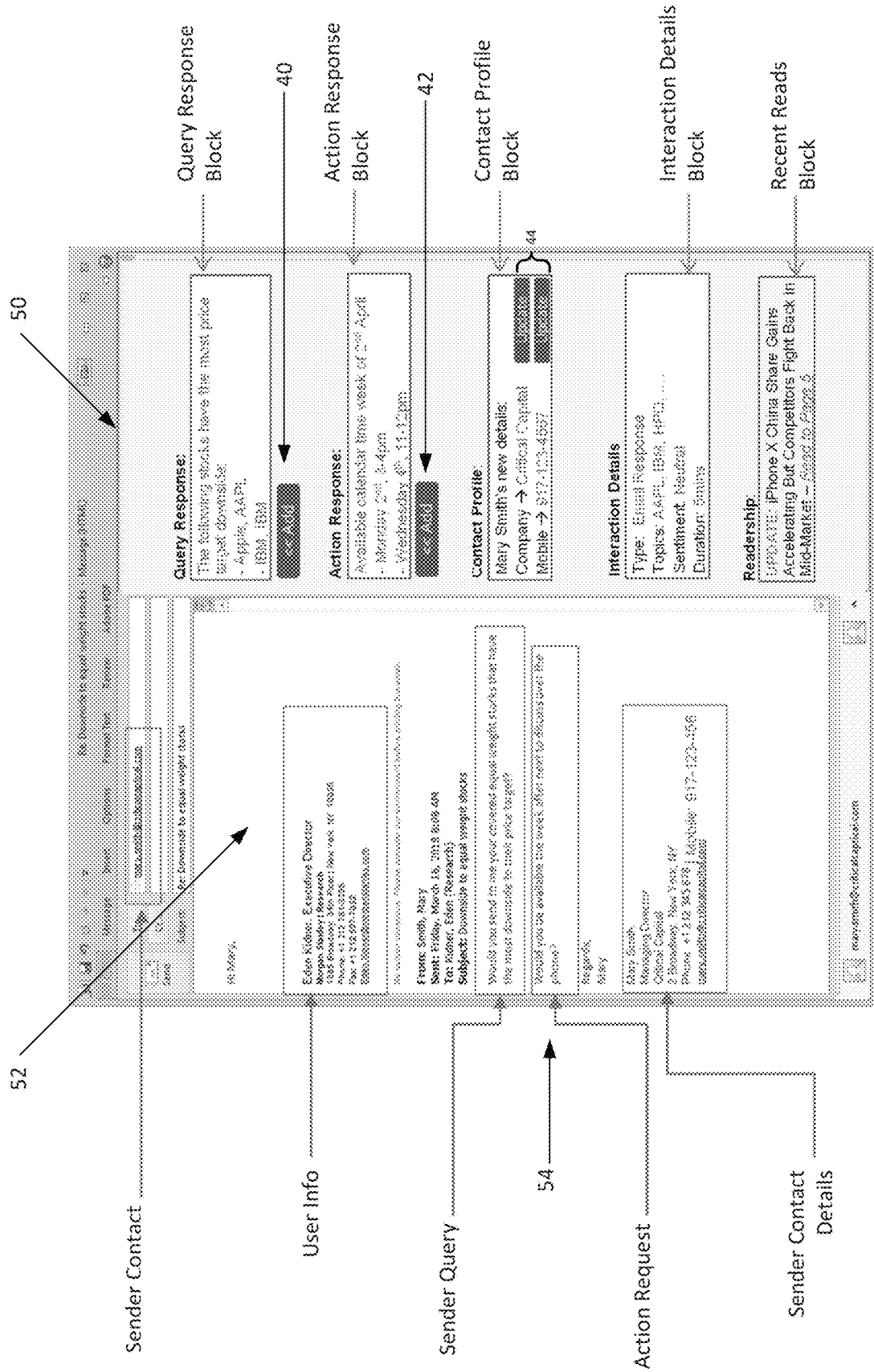
FIG. 2 depicts an example graphical user interface provided by a local assistant software program according to various embodiments of the present invention.

FIG. 2 is a diagram showing an example of the GUI provided by the local assistant program 14 according to various embodiments of the present invention. As shown in FIG. 2, the local assistant program 14 provides a virtual field 50, in this example on the right-side of the email interface, that provides customized responses and information that the user can optionally include, by, in some cases and examples, a single mouse click, an draft response email 52 to be sent in response to an incoming email. The example of FIG. 2 shows on the left side of the GUI, an email 54 received from an original sender, in this example Mary Smith, and, above that still on the left side, the draft response email 50 from the user in response to original sender's email. The callouts on the left side of FIG. 2 generally show the types of information from Ms. Smith's email that are extracted by the intelligent email server 24 in order to generate relevant response content. The callouts on the right side of FIG. 2 generally show the information sent back from the intelligent email server 24 to the local assistant program 14 for inclusion in the GUI. This information includes the relevant response content determined by the intelligent email server 24.

The intelligent email server 24 receives information from the email server 22 about the incoming email to the user. The information received by the intelligent email server 24 can include the sender, the recipient, and the body of the email. It can also include any files (if any) attached to the incoming email. The NLP component 30 and the entity extraction component 34 of the intelligent email server 24 can then identify, using their respective machine learning and AI algorithms, the content in the incoming email. For example, the NLP component 30 can identify details about the sender (including the sender's contact information from the sender's signature block in the incoming email). The intelligent email server 24 can also update the sender's contact information stored in the CRM data store 21, if necessary, based on the signature block in the sender's email.

The entity extraction component can also be trained, through machine learning, to identify the entity associated with the sender, in this example "Critical Capital." The entity extraction component can identify the entity using, for example, the sender's email address and/or the sender's the signature block. Information about the sender and the sender's organization is stored in the CRM and contact interactions data stores 21, 23. For instance, in an example where Critical Capital is a buy-side firm and the recipient organization is a sell-side firm, the CRM data store 21 may store up-to-data about funds administered by the buy-side firm, its holdings, and recent trades. The contact interactions data store 23 can store data about the sender's interactions with the sell-side firm, including to whom and when the sender (Ms. Smith in this example) sent prior emails and made calls to individuals with the sell-side firm, as well as the content or subject of those emails and calls. It can also store data about in-person or virtual meetings (e.g., video, teleconferencing, etc.) that the contact had with the sell-side firm. The intelligent email server 24 can use this information to generate customized response material for the user. Indeed, the contact interactions data store 23 can store such data on all of the sell-side firm's contacts at the buy-side firm and use this aggregate contacts information for the buy-side firm to generate the customized response content for the user.

For example, based on the original sender's email address, the intelligent email server 24 can pull from or access via the various data stores the interest scores for the sender, the research work product published by the sell-side firm recently read by the sender (by tracking as a proxy the research work product downloaded by the sender from the website where the sell-side firm makes its research work product available for download), the sender's recent interactions with the firm (stored in the contact interactions data store 23), and/or the person(s) at the firm with which the sender has the closet (or highest scored/rank) relationship (stored in the CRM data store 21). Based on the recipient of the incoming email (Eden Kinder in the example of FIG. 2), the intelligent email server 24 can pull recent research work product (papers, models, etc., stored in the research library 27) prepared by the analyst team to which the recipient is member. The intelligent email server 24 can also look up the recipient's job function in the HR database 25. For example, the recipient could be member of a research team and his/her job responsibilities could include responding to incoming emails from firm contacts about research published by the recipient's analyst team.

The NLP component 30 can also identify the substance, or body, or content of the incoming email so that the other components (e.g., the intent extraction component 32) of the intelligent email server 24 can extract and decipher the intent of any questions or requested actions in the body of the email.

Using the NLP component 30, the intelligent email server 24 can identify and interpret questions in the body of the email. Using its AI and NLP capabilities, the NLP component 30 can identify securities (e.g., stock tickers, publicly traded companies, commodities) referred to in the body of the email. It can also identify, people, places and/or industries (if any) referred to in the body of the email. For example, if the sender asked about pharmaceutical stocks in Europe, the NLP component 30 can be trained to identify Europe as a place and pharmaceuticals as an industry. Those keywords can be used when searching for responsive documents in the research library 27. Along those lines, if the sender asks about a CEO or other officer of a publicly traded company, or about an industry or trade association spokesperson, etc., some as questions about recent comments made by the individual about the outlook for the company or industry, the NLP component 30 can be trained to identify the name of the individual, which can be used when searching for responsive information in the documents in the research library 27.

Once the content of the incoming email is identified, the intent extraction module 32 can, through its machine learning training, identify an intent, theme and/or sentiment of the email. Is it asking about stocks with upside or downside? In the near-term or long-term? Or stocks that will be impacted (or not impacted) by an upcoming or recent event? In terms of investments, is the sentiment bullish, bearish, or neutral? Again, once the intent, theme and/or sentiment are identified, they can be used to search for responsive information in the documents in the research library 27. They can also be stored in the contact interactions data store 23 as metadata about the ender's email (e.g., the sender's email was neutral).

The NLP component 30 and the intent extraction component 32 of the intelligent email server 24 can also identify actions requested in the incoming email, such as a request for a meeting or a call, a request for a particular document or model, etc. Through it training on past emails with action requests, the intent extraction component 32 will be more able to accurately identify commonly requested actions, e.g., actions requested in prior emails on which the intent extraction component 32.

Once this information is identified in the incoming email, the intelligent email server 24 can search for responsive information to include in a response email to the original sender, and that information can be included in the GUI provided by the local assistant plug-in 14 on the user's computer device 10 in an query response block of the GUI, as shown in FIG. 2. For example, based on the identified subject matter and intent of the incoming email, the intelligent email server 24 can determine by searching the research library 27 a response to the sender's query and send the response to the local assistant plug-in 14 for display in the GUI, as shown in FIG. 2. The GUI can also include a query response add button 40 that the user can select to automatically include the query response from the intelligent email server 24—with one or a limited number of user clicks or interactions with the GUI—in the response email back to the original sender. Instead of auto-adding the query response via the button 40, the user could also copy the suggested query response and paste it into the draft email response body 50 through conventional cut and paste pointer (e.g., mouse) operations or manipulations.

Similarly, when the identified action request is a meeting (in-person, via phone or video, etc.), the intelligent email server 24 can pull the recipient's calendar information, which can be stored in the email server 22 or another data store, to identify a possible date(s)/time(s) for the meeting. The intelligent email server's determination of the response to the detected action requested in the original incoming email can be shown to the user in an action response block of the GUI. There can also be an associated action response button 42 that the user can select to automatically include the content of the action response block from the intelligent email server 24—with one or a limited number of user clicks or interactions with the GUI—in the response email back to the original sender. Also, the user could also copy the content of the action response block and paste it into the draft email response body 50.

The GUI can also include a contact profile block that can show contact information for the sender of the original email (Ms. Smith in this example). In cases where the intelligent email server 24 identifies differences between the contact information in the original email from the sender and the contact information for the sender in the CRM data store 21, the contact profile block can includes buttons 44 that, when activated or clicked by the user, cause the intelligent email server 24 to update the contact information for the original sender in the CRM data store 21.

As shown in FIG. 2, the GUI can also include an interactions detail block that shows how the emails will be logged in the contact interactions data store 23. The interactions will be logged as emails. Other information about the interaction, as determined by the intelligent email server 24, can also be logged in the contact interactions data store 23. For example, the intelligent email server 24 can log in the contact interactions data store 23 that the sender's response referenced certain securities from the content of the query response upon the user clicking the button 40 to add (or otherwise adding) the subject matter of the query response generated by the intelligent email server 24. The intelligent email server 24 can also assign a duration to the email, which duration can be assigned, for example, based on the length (or number of words or stocks) referenced in the emails.

The GUI could also show other relevant information, such as, in the recent reads block shown in FIG. 2, recent reads by the original sender of research published by the sell-side firm in a readership block. The readership block may show, for example, the last piece read by the sender (based on what the original sender accesses via the sell-side firm's research publication website). The sell-side firm's research publication website can also track how many pages the original sender read of that research pieces based on how many pages the original sender scrolled through on the website, and that information can be included in the GUI for the user's edification.

Figure 3:
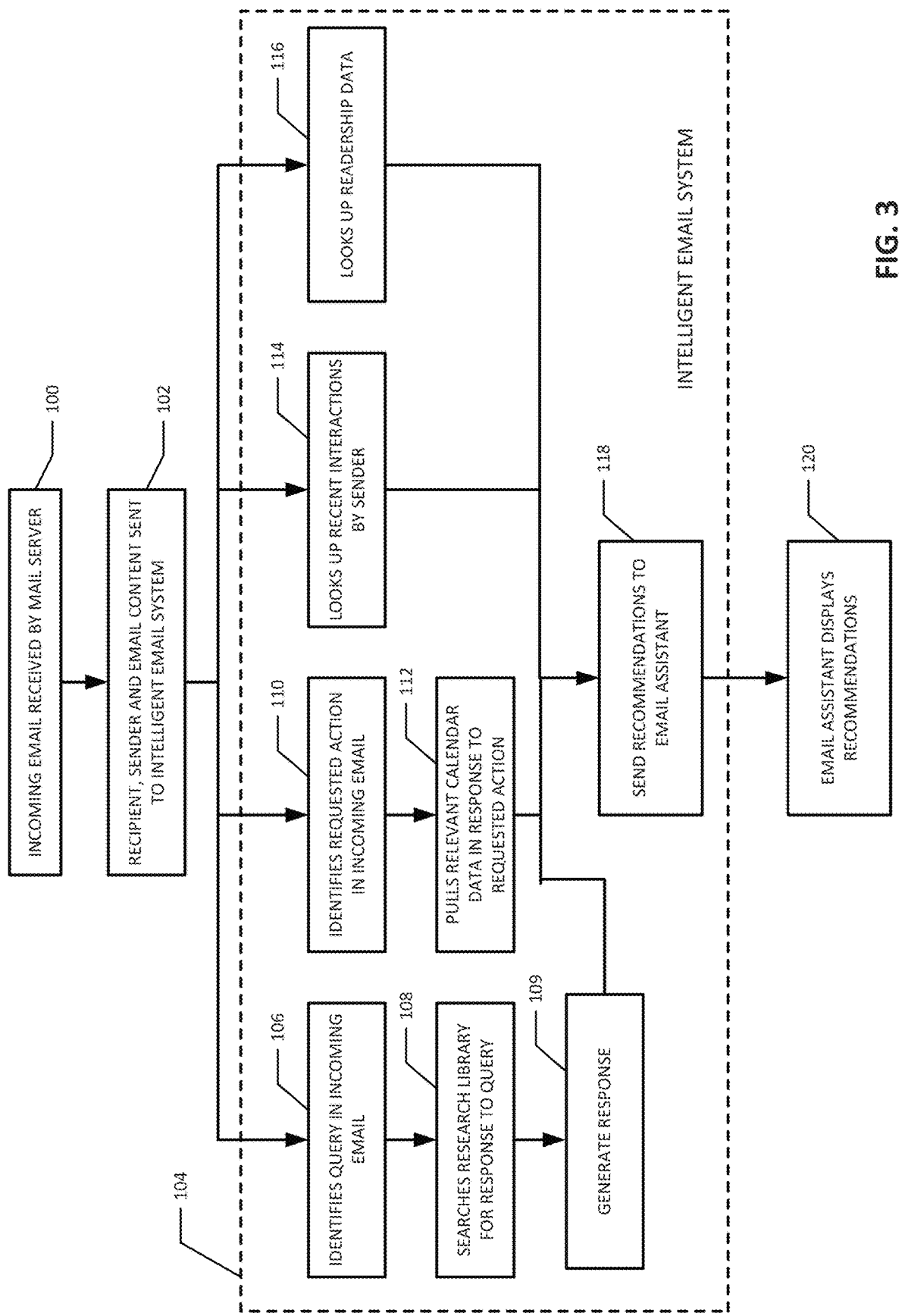
FIG. 3 is a flowchart of a method performed by the computer system of FIG. 1 according to various embodiments of the present invention.

FIG. 3 is a flow chart of a process according to various embodiments of the present invention. The illustrated process starts at block 100 when an incoming email (e.g., the original email from Ms. Smith) is received by the email server 22 of the recipient's network. At block 102, the email server 22 forwards to the back-end intelligent computer system 24 information and details about the received email, including the recipient, the sender, the content (body) and any attachments. The back-end intelligent computer system 24 may then perform a number of intelligent, AI-based functions as described herein and as shown generally at block 104 in FIG. 3. For example, at block 106, the NLP component 30 of the back-end intelligent computer system 24 can identify the query in the incoming email and, upon the query being identified, at step 108, search the research library 27 for relevant responses to the query.

The relevancy algorithms 36 can determine the relevance of the information in the research library 27 that is potentially responsive to the query. For example, each document in the research library 27 can be tagged and those tags can be used to search for the relevant documents. In the sell-side research context, the tags could be the company(ies) to which the research pertains, the industry sector(s) of the company(ies), the geographical region(s) of the company(ies), and, if relevant, the investing sentiment of the research (e.g., bullish, bearish, neutral). That way, when a buy-side contact asks about the outlook for the stock of a particular company, the relevancy algorithms 36 will score the documents pertaining to that company more highly. Also, documents about the company's sector and/or geographical region could also be scored as being moderately relevant. Still further, more recent research documents in the research library 27 can be weighted higher (as more relevant) than older (more stale) research documents. Also, documents that are primarily about the subject matter of the query (companies, investments, regions, etc. in the query) can be weighted higher (as more relevant) than research documents that are marginally or tangentially related to the subject matter of the query. Based on these and other applicable factors, the relevancy algorithms can score the documents in the research library 27 in terms of relevance to the query in the incoming email.

Then, at block 109 the NLP component 30 of the back-end intelligent computer system 24 can generate a response to the inquiry in the incoming email based on the relevant documents found in the research library 27. Thus, the response is not a "canned," pre-prepared response, but instead is generated specifically in response to the incoming. The generated response could be the same as (or similar to) a response to another inquiry in another (second) incoming email, where the inquiry in the second email is on the same topic and close in time (so that the same documents in the research library 27 are the same from a timing perspective). At step 118 the prepared response can then be transmitted by the back-end intelligent computer system 24 to the local assistant 14 on the user's device 10 for, at step 120, display on the GUI provided by the local assistant 14, as shown by the example query response block in FIG. 2.

At step 110, the NLP component 30 of the back-end intelligent computer system 24 identifies actions requested in the email, such as requests for a meeting, conference, etc. At step 112, the back-end intelligent computer system 24 searches calendar information stored on, for example, the email server 22 for open meeting/conference times for the email recipient. Those available times can then be transmitted at step 118 by the back-end intelligent computer system 24 to the local assistant 14 on the user's device 10 for, at step 120, display on the GUI provided by the local assistant 14, as shown by the example action response block in FIG. 2.

At step 114, the back-end intelligent computer system 24 can look up recent interactions that the firm had with the sender of the email in the contact interactions database 23 based on the sender information in the email. Those recent interactions can then be transmitted at step 118 by the back-end intelligent computer system 24 to the local assistant 14 on the user's device 10 for, at step 120, display on the GUI provided by the local assistant 14. The back-end intelligent computer system 24 could also look up the rank or level of relationship between the sender and recipient from the CRM database 23 and display that information on the local assistant GUI so that the user can have a readily available and easy-to-see reminder of the relationship level.

At step 116, the back-end intelligent computer system 24 can look up the readership data for the email sender, e.g., recent reads, popular topics, etc. The readership data can then be transmitted at step 118 by the back-end intelligent computer system 24 to the local assistant 14 on the user's device 10 for, at step 120, display on the GUI provided by the local assistant 14, as shown by the example recent reads block in FIG. 2.

The email client 12 may be an email program, such a MS Outlook, that resides on and is run by the user computer device 10, in which case the local assistant program 14 can be a plug-in that provides added functionality to the email client 12 as described herein. In other embodiments, the email client 12 may be a browser that displays a webmail client, in which case the local assistant program 14 can be an extension for customizing the browser as described herein. The local assistant program 14 and the back-end intelligent computer system 24 can exchange data and communicate with email server 22 using application programming interfaces (APIs) for the email server 22. An API is an interface implemented by a program code component or hardware component (hereinafter "API-implementing component," e.g., here the email server 22) that allows a different program code component or hardware component (hereinafter "API-calling component," e.g., here the local assistant program 14 and/or the back-end intelligent computer system 24) to access and use one or more functions, methods, procedures, data structures, classes, and/or other services provided by the API-implementing component. An API can define one or more parameters that are passed between the API-calling component and the API-implementing component. An API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. The API-calling component may be a local component (i.e., on the same data processing system as the API-implementing component) or a remote component (i.e., on a different data processing system from the API-implementing component) that communicates with the API-implementing component through the API over a network. An API is commonly implemented over the Internet such that it consists of a set of Hypertext Transfer Protocol (HTTP) request messages and a specified format or structure for response messages according to a REST (Representational state transfer) or SOAP (Simple Object Access Protocol) architecture.

The NLP module 30 can used machine-learning trained, deep neural networks to process and analyze the natural language data in the incoming email and in the research library 27, and to generate the natural language response to the query in the email from the sender. In various embodiments, the NLP module 30 can utilize the TensorFlow Python library for fast numerical computing to create the deep neural networks for the NLP module 30. In particular, the NLP module 30 can employ deep Recurrent Neural Networks (RNNs).

The back-end intelligent computer system 24 can also prioritize incoming emails to the user over a time period, e.g., the past hour, the current day, a past several days, etc. That way, the user can respond to the highest-priority emails first when the user has time to respond to his/her incoming emails. The back-end intelligent computer system 24 can prioritize emails according to a number of factors, including the content of the email and the sender. For example, incoming emails that pertain the user's job function, as determined by the back-end intelligent computer system 24, can be prioritized higher than emails that do not pertain to the user's job function. Also, incoming emails that are marked as high-priority or urgent can be prioritized higher than incoming emails that are not so marked. Also, emails from contact at companies (e.g., buy-side firms) that have a higher service level tier can be prioritized higher that emails from companies having a lower service level tier. The GUI provided by the local assistant program 14 can show the (read and/or unread) emails to the user in prioritized order and/or include a notation or icon that indicates the priority of the emails.

The back-end intelligent computer system 24 can also in the research library 27 (or another data store) the emails sent by the sell-side analysts to their contacts and the back-end intelligent computer system 24 can also then additionally use those emails to generate the response to a new incoming email to a sell-side analyst. If one or more analysts receive similar emails with similar requests within a short time period (short enough that a prior response is still relevant time-wise), the back-end intelligent computer system 24 can use those prior emails, in addition to the research work product stored in the research library 27, to generate the response to the queries.

The above-described systems and method provide many practical and technical advantages over current email systems and email plug-ins. For example, sell-side analysts are often prohibited from providing buy-side contacts non-published research. By generating the responses from the word-searchable documents in the research library, which stores the research work product produced by the sell-side firm, the system reduces, and can eliminate, the chance that a sell-side analyst provides non-published research to the buy-side contact. Also, because the system generates the responses, the responses will tend to be more consistent across multiple incoming emails on the same topic. Also, the graphical user interface, which includes incoming-email-specific, appropriate, automated responses that the user can automatically add, simplifies the process of drafting the response email. The user can simply click the button 40, 42 (see FIG. 2), or copy and paste it into the body of the response email, to automatically add the generated responses to the response email. In addition, in various embodiments, the graphical user interface may also have a mechanism for the user to provide feedback to the back-end intelligent computer system 24 on the appropriateness of the automated responses generated by the back-end intelligent computer system 24. Based on the feedback, the neural models of the back-end intelligent computer system 24 can be continually trained to be more accurate and/or appropriate.

Figure 6:
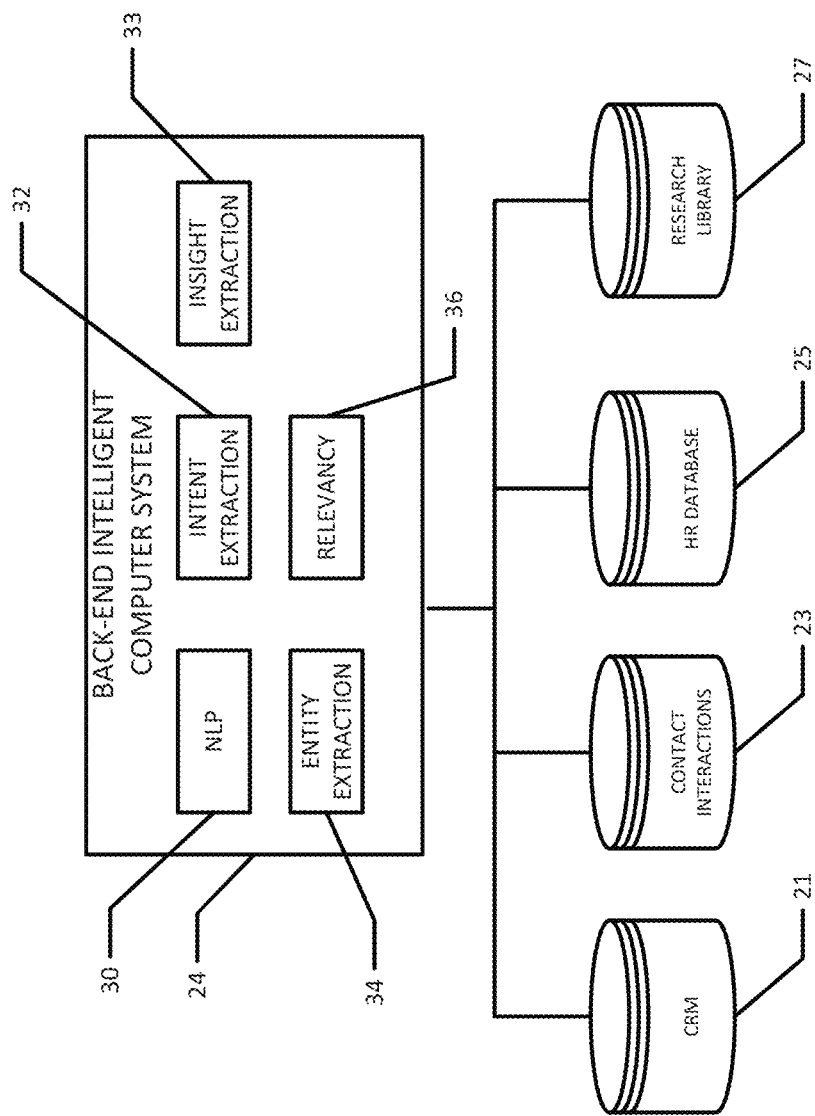
FIG. 6 is a diagram of the back-end intelligent computer system of FIG. 1 according to other various embodiments of the present invention.

In other embodiments, the back-end intelligent computer system 24 can also be trained to give the end user (e.g., an analyst) suggested content and/or actions to take. For example, as shown in the example of FIG. 6, the back-end intelligent computer system 24 can also comprise a machine-learning insight extraction model(s) 33 that is trained to determine (and return to the end user) contextual information, as well as determine future actions to take relative to the contact (e.g., the email sender). The future actions could be actions, such as, inviting the contact to a conference call or meeting on a topic relevant for the contact; create or add a subscription for the contact; introducing the contact to another research team; etc. The insight extraction model 33 can be trained to identify the recommended future actions based on a likelihood that the contact will be interested in the topic for the call/meeting, which interest can be determined based on the contact's readership (e.g., recent research articles by the firm accessed by the contact and/or recent emails sent by the firm to the contact) or other data about the contact. In one exemplary process, the email from the sender to the recipient can be scanned by the back-end intelligent computer system 24 as described herein. The intent extraction module 32 can then determine the intent of the email. The back-end intelligent computer system 24 can then match the intent to knowledge and content (e.g., in the research library). For example, if the sender's email is about XYZ company, the back-end intelligent computer system 24 can look for knowledge/content in the research library relative the XYZ company. Then the insight extraction model 33 of the back-end intelligent computer system 24 can derive insights and/or actions to suggest to the end user based on the knowledge/content in the research library. For example, the insight extraction model 33 can include machine learning models that are trained to determine a likely behavior of a client after asking a similar question as asked in the sender's email. Thus, the intent extraction module 32 can derive the current ("at this time") intent of the contact based on the current email and the information about the contact (e.g., recent behavior of the contact). The current intent can then be input to the insight extraction machine learning model(s) 33 to determine the future actions to recommend to the user vis-à-vis the email sender/contact. The model 33 can be trained to determine the most optimal or impactful future action for the firm and/or the contact. The recommended future actions can also be displayed by the user interface (see FIG. 2) for the user.

Figure 4:
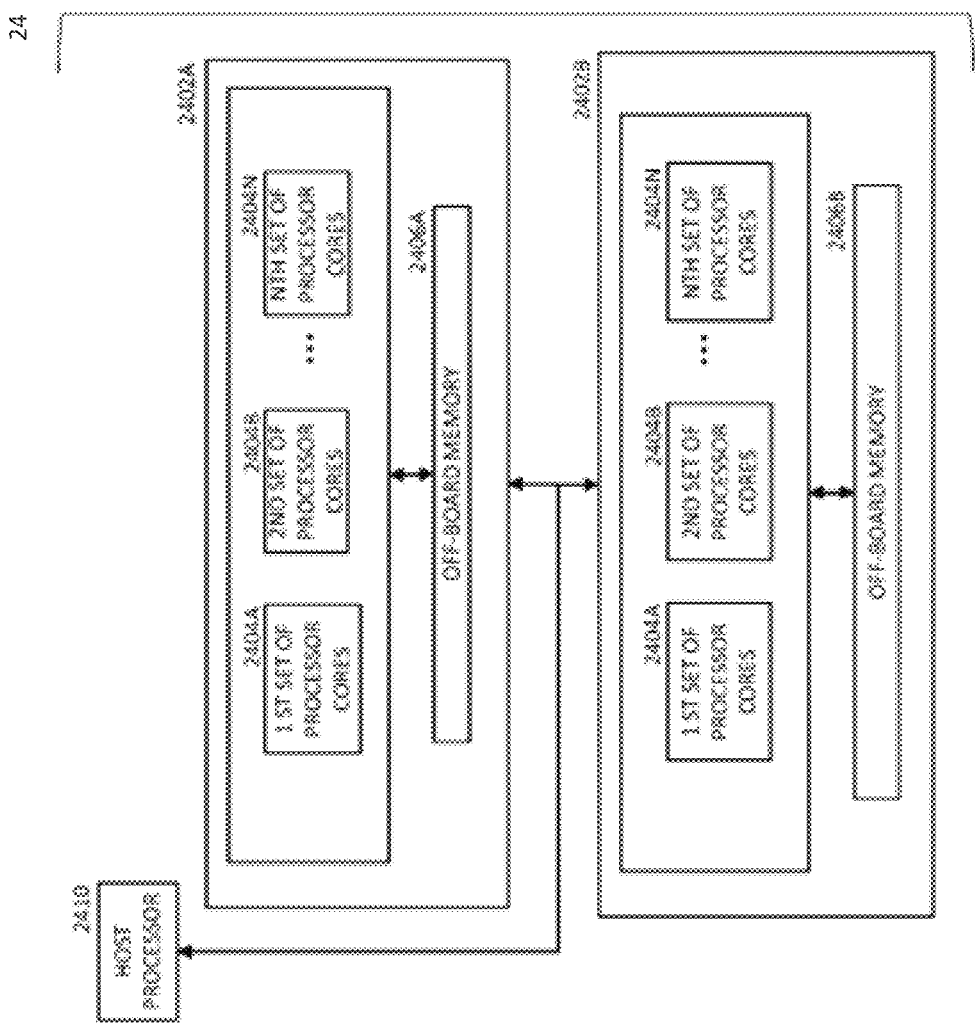
FIG. 4 is a diagram of the back-end intelligent computer system of FIG. 1 according to various embodiments of the present invention.

FIG. 4 is a diagram of the back-end intelligent computer system 24. The illustrated c back-end intelligent computer system 24 comprises multiple processor units 2402A-B that each comprises, in the illustrated embodiment, multiple (N) sets of processor cores 2404A-N. Each processor unit 2402A-B may comprise onboard memory (ROM or RAM) (not shown) and off-board memory 2406A-B. The onboard memory may comprise primary, volatile, and/or non-volatile storage (e.g., storage directly accessible by the processor cores 2404A-N). The off-board memory 2406A-B may comprise secondary, non-volatile storage (e.g., storage that is not directly accessible by the processor cores 2404A-N), such as ROM, HDDs, SSD, flash, etc. The processor cores 2404A-N may be CPU cores, GPU cores and/or AI accelerator cores. GPU cores operate in parallel (e.g., a general-purpose GPU (GPGPU) pipeline) and, hence, can typically process data more efficiently that a collection of CPU cores, but all the cores of a GPU execute the same code at one time. AI accelerators are a class of microprocessor designed to accelerate artificial neural networks. They typically are employed as a coprocessor in a device with a host processor 2410 as well. An AI accelerator typically has tens of thousands of matrix multiplier units that operate at lower precision than a CPU core, such as 8-bit precision in an AI accelerator versus 64-bit precision in a CPU core.

In various embodiments, the different processor cores 2404 may train and/or implement different components of the back-end intelligent computer system 24. For example, one or more of the processor cores 2404 and/or one or more of the processor units could implement the NLP component 30 of the back-end intelligent computer system 24. One or more host processors 2410 may coordinate and control the processor units 2402A-B.

In other embodiments, the system 2400 could be implemented with one processor unit 2402. In embodiments where there are multiple processor units, the processor units could be co-located or distributed. For example, the processor units 2402 may be interconnected by data networks, such as a LAN, WAN, the Internet, etc., using suitable wired and/or wireless data communication links. Data may be shared between the various processing units 2402 using suitable data links, such as data buses (preferably high speed data buses) or network links (e.g., Ethernet).

The software for the back-end intelligent computer system 24 and other computer functions described herein (e.g., the local assistant program 14) may be implemented in computer software using any suitable computer programming language, such as .NET, C, C++, or Python, and using conventional, functional, or object-oriented techniques. For example, the back-end intelligent computer system 24 may be implemented with software modules stored or otherwise maintained in computer readable media, e.g., RAM, ROM, secondary storage, etc. One or more processing cores (e.g., CPU or GPU cores) of the machine learning system may then execute the software modules to implement the function of the respective machine learning system (e.g., student, coach, etc.). Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C #, COBOL, Fortran, Java, Lisp, Pascal, Object Pascal, Haskell, ML; and examples of scripting languages include Bourne script, JavaScript, Python, Ruby, Lua, PHP, and Perl.

Figure 5:
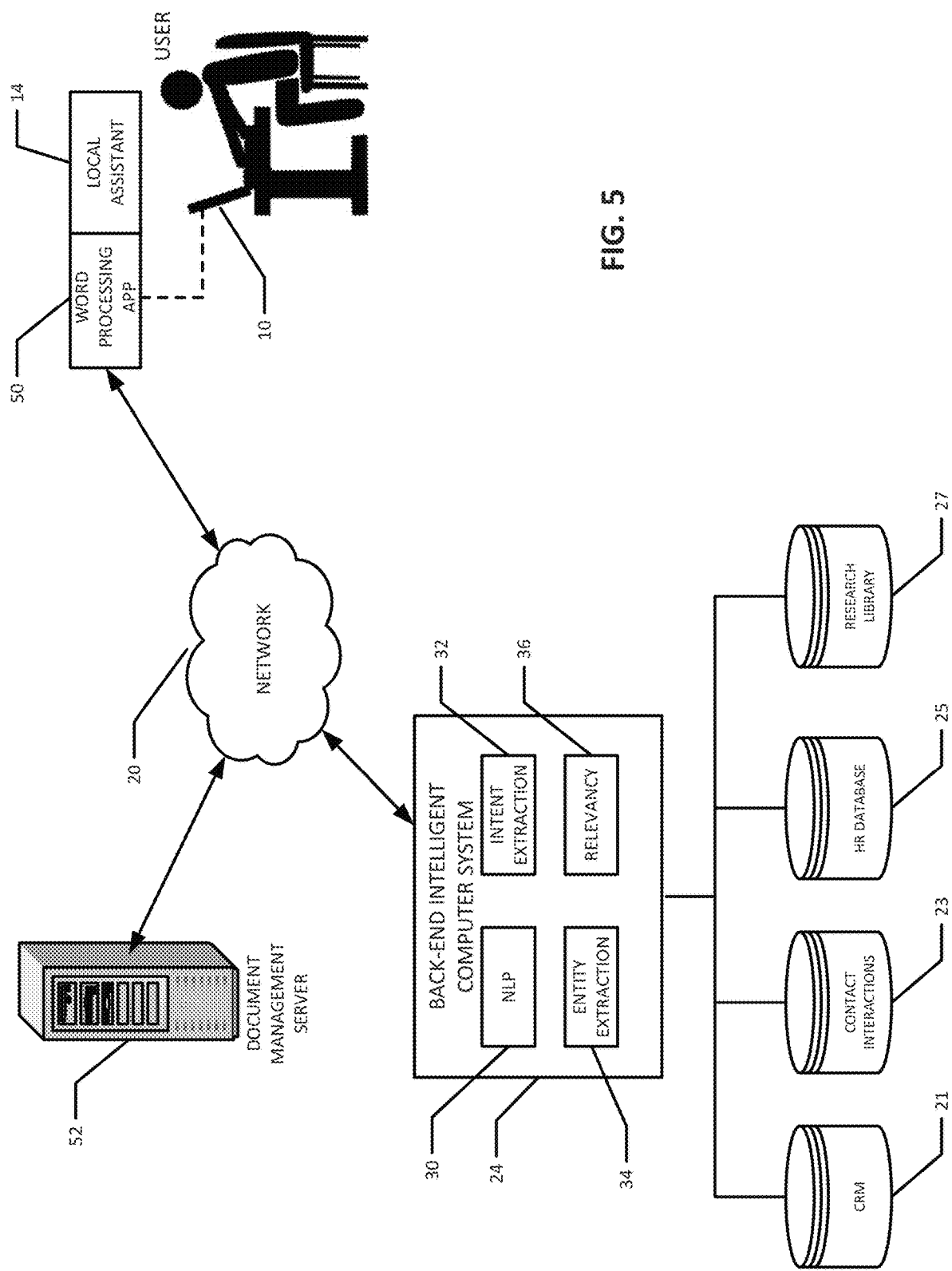
FIG. 5 is diagram of the computer system according to other various embodiments of the present invention.

In the above-described embodiments, the back-end intelligent computer system 24 assisted the user in responding to emails from contacts. In other embodiments, the back-end intelligent computer system 24 could be used with other types of applications, such as authoring programs, such as a word-processing program as shown in FIG. 5. In the example shown in FIG. 5, the user's local computer device includes a word processing application, such as MS Word. The user's corporate network could also comprise a document management server 52. In this embodiment, as the user writes a word product document on the word processing app 50, the document management server 52 periodically stores the document and forward the content of the document to the back-end intelligent computer system 24. The back-end intelligent computer system 24 can then identify the intent, entities, etc. of the word document just as it does for email and then search the research library 27 for relevant documents. The back-end intelligent computer system 24 can then forward the most relevant text written about the topic of the document being prepared by the user. The relevant text can be displayed by the GUI of the local assistant as the user authors the document in the word processing app 50.

The user can then click on the insert button to automatically, with one click, insert the text into the document while being prepared by the user.

In various implementations, the back-end intelligent computer system 24 could also sort the user's incoming emails based on, for example, priority, before being read by the user 10. That way, the incoming emails can be presented to the user 10 by the email 12 in a manner that is sorted by priority. Priority could be based on, for example, time-sensitivity and/or importance of the sender's client to the firm. For example, emails where the responses are more time sensitive can be scored as a higher priority that emails where the responses are less time sensitivity. The back-end intelligent computer system 24 can determine the time sensitivity using the machine learning models of the back-end intelligent computer system 24. The emails could be sorted, additionally or alternatively, for example, based on client priority. Clients that are more important to the user's firm or to the user, by some measure of importance, can be scored higher than clients that are less important. The user's unread emails can be displayed in the email client in order by the priority determined by the back-end intelligent computer system 24.

In addition (or alternatively) to sorting the emails based on priority, the back-end intelligent computer system 24 can the insight extraction model 33 can generate a prioritized list of suggested actions to be performed by the user 10 based on received emails over a certain time period (overnight, prior 24 hours, a time period specified by the user, etc.). The back-end intelligent computer system 24 can scan and aggregate the emails received over the selected time period as described herein, determine the intent of the emails, and determine suggested follow-up actions for the emails (e.g., the insight extraction model 33). The back-end intelligent computer system 24 can then sort the suggested actions according to some measure of priority, such as prioritization based on time-sensitivity and/or importance of the email sender or client, or other relevant factors. The prioritized suggested actions can then be shown to the user in the user interface (see FIG. 2) presented to the user by the local assistant 14. The impact of such functionality could be significant. When the user/analyst 10 comes in to work in the morning (or accesses their overnight emails remotely), the back-end intelligent computer system 24 will have already sorted through the user's emails, prioritized them in the user's email inbox, and generated a prioritized list of suggested actions to execute on that day, as well as the suggestions for each individual email as well, as described above.

In the above-described embodiments, the analysis by the back-end intelligent computer system 24 was initiated in response from an email from the email sender/contact to the user. In other embodiments and implementations, the analysis by the back-end intelligent computer system 24 could be initiated by a voice assistant for the user. For example, the user's computer could comprise voice assistant functionality (e.g., Siri, Alexa, etc.), and the user could ask the back-end intelligent computer system 24 about a particular contact or a particular stock, etc. via the voice assistant. Also, the local assistant 14 could have a text-based search field where the user could type in a request for the back-end intelligent computer system 24. Still further, particularly for implementations where the local assistant 14 interfaces with a productivity application (e.g., word processing application 50), the user could highlight or scan a portion of a document to query the back-end intelligent computer system 24 for insights about the highlighted/selected section of the document.

In the above-described embodiments, the local assistant 14 is described as a plug-in or extension to a software program on the user's computer, such as an email client 12 (see FIG. 1), a browser, or a productivity software program, such as word processing application 50 (see FIG. 1), a presentation editor (e.g., Powerpoint or the like), a spreadsheet application (e.g., Excel), etc. In yet other implementations, the local assistant 14 can interface with and be accesses by other types of applications, such as a chat client (e.g., Symphony) on the user's computer. It should also be clear that the user's computer could be a mobile device, such as a smartphone or tablet computer.

Figure 8A:
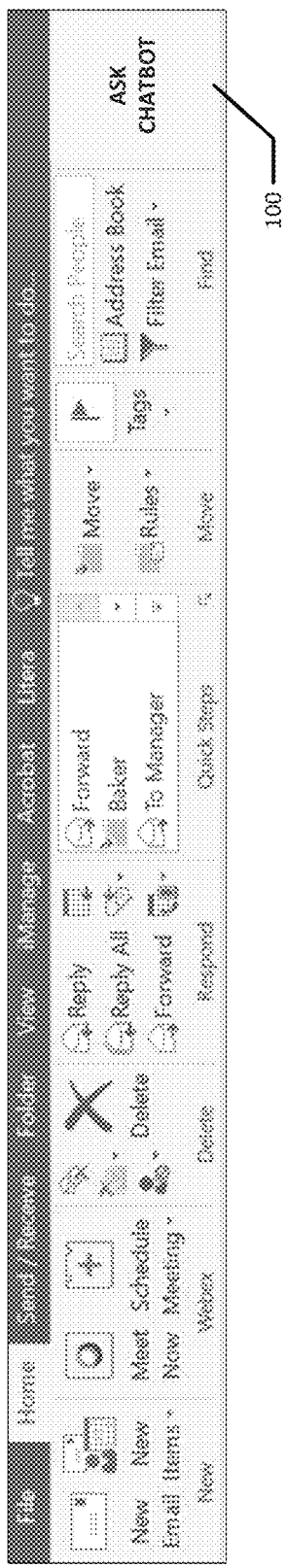
FIGS. 8A, 8B and 9 depict interfaces for an end-user to invoke the back-end intelligent computer system according to various embodiments of the present invention.
Figure 8B:
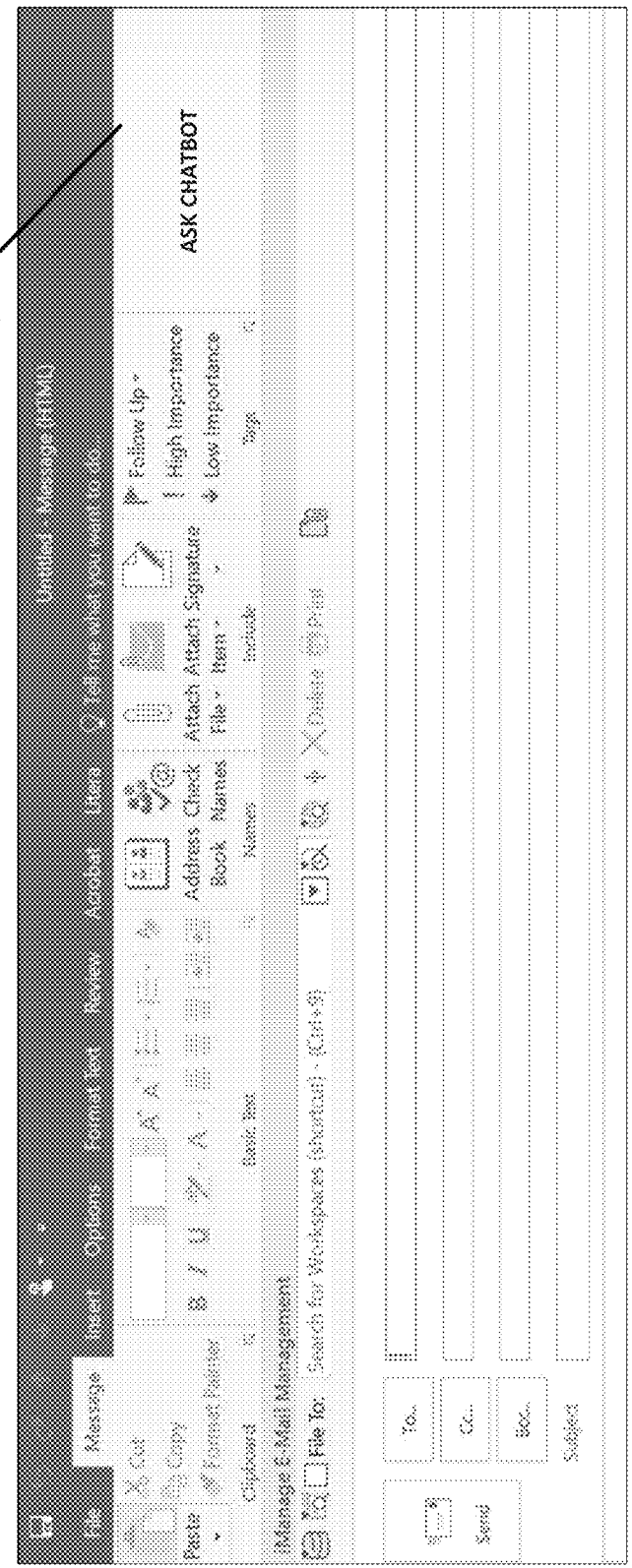

As mentioned above, in other implementations, the end-user could actively invoke the back-end intelligent computer system 24 to obtain information relative to the end-user's job function. FIG. 7 depicts an exemplary set-up for such an implementation. In this implementation, the end-user's computer 10 uses a primary software application 12 and a secondary software application 14. The primary software application 12 can be, for example, a software application that the end-user uses to create work product, such as email application, a word processing application, a spreadsheet application, and instant messaging application, etc. The secondary application 14 can be a plug-in or extension, for example, of the primary application 12, where the secondary application allows the end-user to invoke the assistance of the back-end intelligent computer system 24 from the primary application 12. For example, the secondary application 14 could install a button or otherwise activable link or icon on the interface provided by the primary application. FIGS. 8A and 8B show examples where the primary application 12 is an email application. In the example of FIG. 8A, the user can click the "Ask Chabot" icon 100 to invoke the back-end intelligent computer system 24 from the user's in-box interface. In the example of FIG. 8B, the user can click the "Ask Chabot" icon 100 to invoke the back-end intelligent computer system 24 from an email being drafted by the end-user. Similar type icons could also be used for other types of primary applications.

Activating the icon 100 can open a window in which the end-user can type a question, or even just a topic (which the back-end intelligent computer system 24 can assume to be a question about the topic). When the user enters the question, the question can be routed to the back-end intelligent computer system 24 for processing. In other embodiments, the user can voice-activate the window to enter a question and/or voice the query itself. That is, for example, the second application 14 may comprises a voice recognition system that can process and respond to voice commands by the end-user. For example, the user could audibly say "Ask Chatbot," in which case, in response to recognition of the voice command, the second application 14 can open the window for the user to input the query for the back-end intelligent computer system 24. Also, once the window for inputting the query is open, the user could voice the query. The secondary application 14 could then recognize query and display it textually in the window for the user's approval prior to transmission to the back-end intelligent computer system 24.

As shown in FIG. 7, the back-end intelligent computer system 24 may include many intelligent agents, including one or more front-end agents 110 and several local agents 112. The front-end agent 110 may comprise NLP, intent extraction, entity extraction and relevancy modules 30-36 as described above (see FIG. 1). Also, in various embodiments, each of the local agents 112 may be associated with a particular database of the firm. The illustrated embodiment shows three research library databases 27A-C to illustrate that the research library could be spread across many databases across the firm's computer network. The CRM, contact interactions and HR databases 21, 23, 25 could also be spread across many databases in the firm. Each local agent 112 can be tuned or trained, through machine learning, to respond queries relevant to the local agent's associated database. That is, for example, each of the local agents 112 can be tuned or trained to retrieve data from its associated database in response to a query from the end-user. For example, a local agent 112 associated with a research library database 27 can be tuned to retrieve research that is optimized in both terms of relevancy and timeliness (e.g., recency). On the other hand, for example, a local agent 112 associated with a contact interactions database 12 can be tuned or trained to retrieve data about the contact's interactions with the sell-side research firm that are optimized for timeliness and relevancy of the interactions. The local agents 112 can also each include NLP, intent extraction, entity extraction and relevancy modules 30-36 (see FIG. 1) so that the local agents 112 can engage in dialogue with the end user.

In operation, the user submits a query to the back-end intelligent computer system 24. The front-end intelligent agent 110 can be trained through machine learning to process the incoming request to, among other things, determine the entity and intent that is the subject of the query. For example, in the sell-side research context, the end-user might be writing an email to a client about publicly-traded XYZ Corp. The end-user might invoke the back-end intelligent computer system 24 to ask for recently published research about XYZ Corp. so that the end-user can forward that research to the contact. The front-end intelligent agent 110 can process the incoming request to extract the entity "XYZ Corp." from the request and to identify the intent of the request as seeking recent research. The front-end intelligent agent 110, having been trained through machine learning, can identify the proper local agent 112 to handle the request. The front-end agent 110 can then forward the query and/or the information extracted from it by the front-end agent 110, to the identified local agent 112. For example, if the front-end agent 110 determines that research about XYZ Corp is stored in the research database 27A, it can direct the query to the local agent 112 corresponding to the research database 27A. The local agent 112 for the research database 27A can then respond to the user. For example, the local agent 112 could respond with URLs that are links to the recently research publications of the sell-side firm pertaining to XYZ Corp. The end-user could then copy/paste the URLs into the work product (e.g., email) that the end-user is creating.

If the end-user's request is about interactions by the client with the sell-side form, about holding of the contact's buy-side firm (e.g., does the buy-side firm hold or trade stock of XYZ Corp.), etc., the front-end agent 110 can direct the end-user's query to the appropriate local agent 112 and corresponding database. The local agents 112 can be tuned or trained, through machine learning, to respond efficiently, accurately and quickly to queries pertaining to their associated database. The front-end and local agents 110, 112 can be trained with training queries using supervised, semi-supervised or unsupervised training. The front-end and local agents 110, 112 may comprise any suitable machine learning architecture to learn their required skills and functions. For example, the front-end and/or local agents 110, 112 could comprise deep artificial neural networks. The local agents 112 may extract and/or retrieve data from their associated databases using web service calls or APIs.

The back-end intelligent computer system 24, via the front-end and local agents 112 for example, could also engage in a dialogue with the end-user in response to a query from the end-user. For example, in addition to providing the information responsive to the request, the agents 110, 112, individually or collectively, of the back-end intelligent computer system 24 could respond with additional information relevant to the end-user's query. For example, if the end-user asks about recent publications about XYZ Corp., in addition to responding with the recent publications, the back-end intelligent computer system 24 could respond with additional relevant information, such as information about an upcoming seminar by the sell-side analyst that covers XYZ Corp. As another example, if the query is just the sell-side firm's rating for XYZ Corp. (e.g., buy, sell, hold, overweight, underweight, etc.), the back-end intelligent computer system 24 could respond with the recent publications as well. The agents 110, 112 can be trained through machine-learning or a rules-based AI system to provide the up-to-date additional information as part of the dialogue. To that end, the secondary application 14 could also allow the end-user to rate the additional information (e.g., helpful, unhelpful, etc.). The models for the front-end and local agents 110, 112 could be updated based on feedback so that they are trained to respond with better additional information and/or suggestions as part of the dialogue.

In various implementations, invocation of the "Ask Chatbot" (or other name) feature can cause the secondary application to display a menu of possible query topics, such as contact interactions by the contact, holdings and trade of the contact's firm, readership interests of the contact. Such specific query topics can allow the front-end agent 110 to more accurately and efficiently direct the query to the appropriate local agent 112.

Also, as may be apparent from the foregoing description, the operation of the behind-the-scenes operation of back-end intelligent computer system 24 can be transparent to the end user. As far as the end-user can perceive, the "Ask Chatbot" feature accepts and responds to queries of the end-user, and may supply additional relevant information or suggestions as described above. The end-user may not realize that a front-end agent 110 directs that incoming queries to appropriate local agents, or that the end-user may be dialoging with different local agents at different times.

Figure 9:
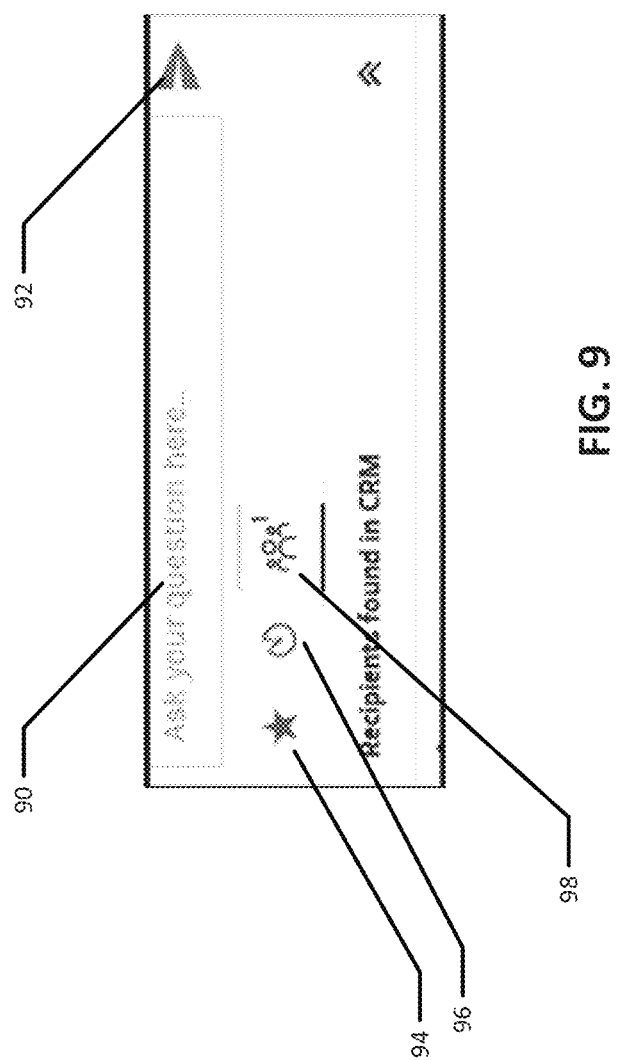

FIG. 9 depicts another example of how the end-user could invoke the assistance of the back-end intelligent computer system 24 from the primary software application. The example of FIG. 9 includes a free text window where the user could type the query or request for the intelligent assistants. The user could then activate the send button 92 to cause the query/request to be transmitted via the network 20 to the back-end intelligent computer system 24.

The example of FIG. 9 assumes that it is being used in a primary application 12 where there is a corresponding contact(s) for the end-user, such as an email application where the end-user is drafting emails to the contact(s). In such an embodiment, the button provided by the secondary application in the email primary application 12 can also include a favorites icon 94 and an interactions icon 96. The user could activate the favorites icon 94 to obtain (from the back-end intelligent computer system 24) information about recent or favorite reads by the contact (e.g., recent published research by the sell-side firm that the contact accessed). The user could activate the interactions icon 96 to obtain (from the back-end intelligent computer system 24) information about interactions that the contacts had with the sell-side firm. The end-user could also active a contact's info button 98 to get information about the contact, such as contact information and holdings/trades by the funds associated with the contact. These or other particular icon/buttons 94-98 for specific information eliminates the need for the end-user to input specific requests for this information in the free text box 90, thereby saving the end-user time.

The active and passive embodiments described herein are not necessarily separate. The computer 24 could provide at the same time both (1) systems for scanning the user's work product (e.g., emails, word processing documents, etc.) to make suggestions for the user in preparing the work product as described generally herein in connection with FIGS. 1-6, and (2) systems that allow the user to actively ask questions or make requests to the back-end intelligent computer system 24 for information as described generally herein in connection with FIGS. 7-9. The intelligent agents 110, 112 described in connection with FIG. 7 are described as being machine-learning systems, such as artificial neural networks. In other embodiments, some or all of the intelligent agents 110, 112 could be rule-based artificial intelligence (AI) agents. A rule-based AI agent produces pre-defined outcomes that are based on a set of certain rules coded by humans. These systems are simple artificial intelligence models which utilize the rule of if-then coding statements.

In one general aspect, therefore, the present invention is directed to computer-based and implemented systems and methods for assisting a user of an organization in responding to, for example, incoming emails. In various implementations, the system comprises a user computer device that comprises a software program for reviewing and drafting emails and an ancillary software program that adds a graphical user interface to the software program. The system also comprises an email server for the organization that is in communication with the user computer device. The system also comprises a database system that comprises a research database, where the research database comprises word-searchable electronic research work product produced by the organization. The system also comprises a back-end intelligent computer system in communication with the email server and the user computer device. The back-end intelligent computer system receives data about an incoming email from a contact to the user. The back-end intelligent computer system comprises trained, machine-learning models, including a Natural Language Processing (NLP) model, such that the back-end intelligent computer system is configured to: identify a query in the incoming email; search the research database for content in the research database responsive to the query; generate a query response that is specific to the query after receiving the data about the incoming email, where the generated query response is based on content in the research database that is most relevant to the query; and transmit the query response to the user computer device. Also, the ancillary software program configures the graphical user interface to display the query response while the user prepares a response email to the incoming email using the software program, where the graphical user interface comprises a query response button through which the user can automatically insert the query response into the response email.

A computer-implemented method for assisting a user of an organization in responding to incoming emails comprises, in one general aspect of the present invention, the step of storing, in a research library of the database system, word-searchable electronic research work product produced by the organization. The method also comprises the step of, upon receiving an incoming email from a contact to the user, forwarding, by an email server for the organization, data about the incoming email to a back-end intelligent computer system in communication. The method also comprises, upon receiving the data about the incoming email, by the a back-end intelligent computer system, using trained, machine-learning models, including a Natural Language Processing (NLP) model: identify a query in the incoming email; search the research database for content in the research database responsive to the query; generate a query response that is specific to the query, where the generated query response is based on content in the research database that is most relevant to the query; and transmit the query response to a user computer device. The user computer device comprises a software program for reviewing and drafting emails and an ancillary software program that adds a graphical user interface to the software program. In that connection, the method further comprise the step of displaying, by the ancillary software, a graphical user interface that displays the query response while the user prepares a response email to the incoming email from the contact using the software program, where the graphical user interface comprises a query response button through which the user can automatically insert the query response into the response email.

According to various implementations of the systems and methods, the software program for reviewing and drafting emails comprises an email client program and the ancillary software program comprises a plug-in software program. In other implementations, the software program for reviewing and drafting email comprises a web browser and the ancillary software program comprises an extension software program.

According to various implementations of the systems and methods, the back-end intelligent computer system is configured to: identify a conference request in the incoming email; search calendar information for the user based on the conference request; generate a conference request response that is specific to the conference request; and transmit the conference request response to the user computer device. Also, the ancillary software program can configure the graphical user interface to display the conference request response while the user prepares the response email to the incoming email from the contact, and the graphical user interface can comprise a conference request response button through which the user can automatically insert the conference request response into the response email.

According to various implementations of the systems and methods, the back-end intelligent computer system is configured to: identify a document in the research database that the contact accessed; and communicate data about the document in the research database that the contact accessed to the user computer device. Also, the ancillary software program can configure the graphical user interface to display, while the user prepares the response email, the data about the document in the research database that the contact accessed.

According to various implementations of the systems and methods, the user computer device further comprises a document authoring software program and the back-end intelligent computer system is configured to: search the research database for content in the research database responsive to a document being authored by the user; generate text for the document based on content in the research database; and transmit the text to the user computer device. The ancillary software program can configure the graphical user interface to display the text while the user prepares the document using the document authoring software program, and the graphical user interface comprises a text insertion button through which the user can automatically insert the text into the document while authoring the document using the document authoring software program. The organization can comprise a sell-side research firm and the research database can comprise word-searchable electronic research work product produced by the sell-side research firm.

According to various implementations of the systems and methods, the back-end intelligent computer system is configured to: identify an investing sentiment in the incoming email; and transmit the investing sentiment in the incoming email to the user computer device. In that case, the ancillary software program can configure the graphical user interface to display the identified investing sentiment in the incoming email while the user prepares the response email.

According to various implementations of the systems and methods, the back-end intelligent computer system is configured to: prioritize incoming emails to the user; and transmit the prioritization date for the incoming emails to the user computer device. In that case, the ancillary software program can configure the graphical user interface to display the prioritization date for the incoming emails to the user.

According to various implementations of the systems and methods, the back-end intelligent computer system is further configured to: based on a trained machine-learning model, determine a suggested follow-on action for the user in response to the incoming email; and transmit the suggested follow-on action to the user computer device for display on the graphical user interface provided by the ancillary software program.

According to various implementations of the systems and methods, the back-end intelligent computer system can be further configured to: generate a prioritization list of incoming emails to the user over a time period based on a priority measure; and communicate the prioritization list to the software program so that the software program displays the incoming emails to the user over the time period according to the prioritization list. Still further, the back-end intelligent computer system can be configured to: based on a trained machine-learning model, determine one or more suggested follow-on actions for the user in response to the incoming emails over the time period; and transmit the one or more suggested follow-on actions to the user computer device for display on the graphical user interface provided by the ancillary software program.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A system for assisting an end-user of an organization, the system comprising:
   an end-user computer device comprising:
      a primary software program, wherein the primary software program for authoring electronic documents; and
      an ancillary software program that interfaces with the primary software program and that provides a graphical user interface for the primary software program;
   a database system that comprises a research database, wherein the research database comprises word-searchable electronic research work product produced by the organization; and
   a back-end intelligent computer system in communication with the end-user computer device and the database system, wherein the back-end intelligent computer system comprises trained, machine-learning models, including a Natural Language Processing (NLP) model, such that the back-end intelligent computer system is configured to:
      receive a current version of an electronic document being authored by the end-user via the primary software program;
      identify subject matter in the current version of the electronic document;
      search the research database for content in the research database relevant to the subject matter in the current version of the electronic document;
      generate text that is relevant to the subject matter, wherein the generated text is based on the content in the research database that is relevant to the subject matter of the electronic document; and
      transmit the generated text to the end-user computer device; and
   wherein:
      the ancillary software program configures the graphical user interface to display the generated text while the end-user prepares the electronic document using the primary software program; and
      the graphical user interface comprises a text insertion input through which the end-user automatically inserts, upon activation of text insertion input, the generated text into the electronic document.

2. The system of claim 1, wherein:
   the software program for authoring electronic documents comprises a document authoring client program; and
   the ancillary software program comprises a plug-in software program.

3. The system of claim 1, wherein:
   the software program for authoring electronic documents comprises a web browser; and
   the ancillary software program comprises an extension software program.

4. The system of claim 1, wherein:
   the organization comprises a sell-side research firm; and
   the research database comprises word-searchable electronic research work product produced by the sell-side research firm.

5. The system of claim 1, wherein:
   the ancillary software program causes a user-selectable element to be displayed by the primary software program; and
   the user-selectable element by the end-user comprises a query interface through which the end-user inputs a query to the back-end intelligent computer system.

6. The system of claim 5, wherein:
the database system comprises a plurality of databases; and
the back-end intelligent computer system comprises a plurality intelligent agents, wherein each intelligent agent is associated with one of the plurality of databases and adapted to retrieve data from the associated database to respond to the query from the end-user.

7. The system of claim 6, wherein;
the plurality of databases comprises a CRM database, a HR database that stores data about employees of the organization; and
the back-end intelligent computer system comprises:
a first intelligent agent that is associated with the CRM database;
a second intelligent agent that is associated with the HR database; and
a third intelligent agent that is associated with the research database.

8. The system of claim 1, wherein the primary software program comprises an email program.

9. The system of claim 1, wherein the primary software program comprises a word processing program.

10. The system of claim 1, wherein the primary software program comprises an electronic presentation program.

11. The system of claim 1, further comprise a document management server that is in communication with the end-user computer device and with the back-end intelligent computer system, wherein the document management server is configured to periodically store, and forward to the back-end intelligent computer system, the current version of the electronic document being authored by the end-user via the primary software program.

12. The system of claim 1, wherein the back-end intelligent computer system:
comprises an intent extraction module that is trained, through machine learning, to extract an intent of the electronic document; and
is configured to search the research database for content based on the intent extracted by the intent extraction module.

13. A computer-implemented method for assisting an end-user of an organization, the method comprising:
storing, in a research library of a database system, word-searchable electronic research work product produced by the organization; and
while the end-user is authoring an electronic document at an end-user computer device using a primary software program, where the primary software program is for authoring electronic documents:
by back-end intelligent computer system using trained, machine-learning models, including a Natural Language Processing (NLP) model:
receiving, by a back-end intelligent computer system that is in communication with the end-user computer device and the database system, a current version of the electronic document being authored by the end-user via the primary software program;
identifying, by the back-end intelligent computer system, subject matter in the current version of the electronic document;
searching, by the back-end intelligent computer system, the research database for content in the research database relevant to the subject matter in the current version of the electronic document;
generating, by the back-end intelligent computer system, text that is relevant to the subject matter, wherein the generated text is based on the content in the research database that is relevant to the subject matter of the electronic document; and
transmitting, by the back-end intelligent computer system, the generated text to the end-user computer device; and
by an ancillary software program of the end-user computer device, displaying on a graphical user interface of the end-user computer device, the generated text while the end-user prepares the electronic document using the primary software program, wherein the graphical user interface comprises a text insertion input through which the end-user automatically inserts, upon activation of text insertion input, the generated text into the electronic document.

14. The method of claim 13, wherein:
the software program for authoring electronic documents comprises a document authoring client program; and
the ancillary software program comprises a plug-in software program.

15. The method of claim 13, wherein:
the software program for authoring electronic documents comprises a web browser; and
the ancillary software program comprises an extension software program.

16. The method of claim 13, wherein:
the organization comprises a sell-side research firm; and
the research database comprises word-searchable electronic research work product produced by the sell-side research firm.

17. The method of claim 13, wherein:
the ancillary software program causes a user-selectable element to be displayed by the primary software program; and
the user-selectable element by the end-user comprises a query interface through which the end-user inputs a query to the back-end intelligent computer system.

18. The method of claim 17, wherein:
the database system comprises a plurality of databases; and
the back-end intelligent computer system comprises a plurality intelligent agents, wherein each intelligent agent is associated with one of the plurality of databases and adapted to retrieve data from the associated database to respond to the query from the end-user.

19. The method of claim 18, wherein;
the plurality of databases comprises a CRM database, a HR database that stores data about employees of the organization; and
the back-end intelligent computer system comprises:
a first intelligent agent that is associated with the CRM database;
a second intelligent agent that is associated with the HR database; and
a third intelligent agent that is associated with the research database.

20. The method of claim 13, wherein the primary software program comprises an email program, a word processing program, or an electronic presentation program.

21. The method of claim 13, further comprising periodically storing and forwarding to the back-end intelligent computer system, by a document management server that is in communication with the end-user computer device and with the back-end intelligent computer system, the current version of the electronic document being authored by the end-user via the primary software program.

22. The method of claim 13, further comprising:
- extracting, by a machine-learning-trained intent extraction module of the back-end intelligent computer system, an intent of the electronic document; and
- searching, by the back-end intelligent computer system, the research database for content based on the intent extracted by the machine-learning-trained intent extraction module.

\* \* \* \* \*